United States Patent Office 3,189,617
Patented June 15, 1965

3,189,617
1-ARYLOXINDOLES AND THEIR PREPARATION
Sydney Archer and John W. Schulenberg, Bethlehem, N.Y., assignors to Sterling Drug Inc., New York, N.Y., a corporation of Delaware
No Drawing. Filed Feb. 3, 1961, Ser. No. 86,876
25 Claims. (Cl. 260—319)

This invention relates to a novel process for producing indole derivatives, to novel compounds produced thereby, and to intermediates therefor.

In particular the invention is concerned with a process for preparing 1-aryl-3-aroyloxindoles from N-aroyl-2-carbo-lower-alkoxymethyldiphenylamines, with certain novel 1-aryloxindoles, and with intermediates in the preparation of said oxindoles.

It has been discovered that if an N-aroyl-2-carbo-lower-alkoxymethyldiphenylamine is heated with a strong base under anhydrous conditions, a cyclization reaction takes place and there is produced a 1-aryl-3-aroyloxindole.

The reaction is illustrated in simplest terms by the following transformation showing the conversion of N-benzoyl-2-carbomethoxymethyldiphenylamine to 1-phenyl-3-benzoyloxindole

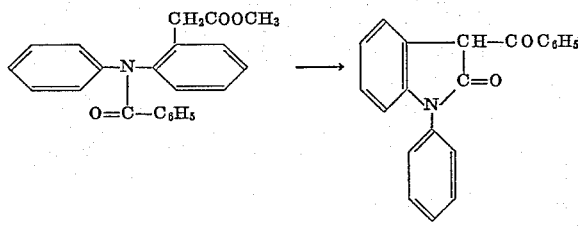

The scope of the process of the invention is, however, not limited to the specific illustration given above. Any one or more of the three phenyl rings can be further substituted by one or more substituents inert under the conditions of the reaction. Exemplary of such inert substituents are lower-alkyl of one to four carbon atoms, lower-alkoxy of one to four carbon atoms, lower-alkylmercapto of one to four carbon atoms, halogen (including fluorine, chlorine, bromine and iodine), carboxy, carbo-lower-alkoxy (the alkyl group having from one to four carbon atoms), nitro, and trifluoromethyl.

The catalyst for the cyclization reaction can be any strong base useful in effecting Claisen-type elimination reactions. Such strong bases include alkali metal lower-alkoxides, amides and hydrides. The reaction takes place in an inert organic solvent, such as benzene, toluene, xylene, dioxane, petroleum ether and the like, preferably at a temperature between about 50° C. and 150° C.

Preferred aspects of the invention are set forth in the following flow sheet.

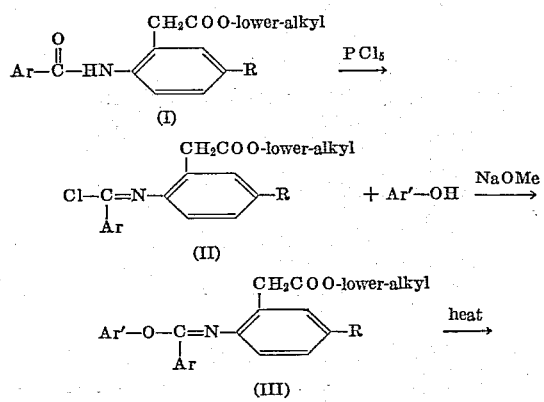

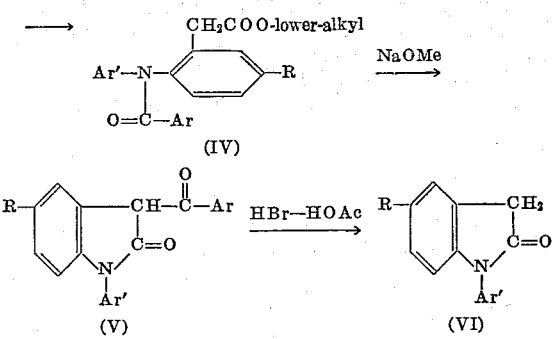

In the above formulas, Ar and Ar' are monocarbocyclic aryl radicals, and thus stand for phenyl or phenyl substituted by inert substituents as described hereinabove. R is hydrogen or lower-alkoxy having from one to four carbon atoms. Lower-alkyl encompasses alkyl groups having from one to four carbon atoms.

A 2-carbo-lower-alkoxymethyl-N-aroylaniline of Formula I is converted to the corresponding imino chloride of Formula II by reaction with phosphorus pentachloride. The imino chloride (II) is then condensed with phenol or a substituted phenol in the presence of a strong alkali metal base such as sodium methoxide. The phenol thus reacts in the form of its alkali metal salt. The product produced is an N-[2-(carbo-lower-alkoxymethyl)phenyl]-benzimino aryl ether (III). The latter upon heating, preferably at a temperature between about 150° C. and 300° C., is rearranged to an N-aroyl-2-carbo-lower-alkoxymethyl-diarylamine of the Formula IV. The next step is the cyclization reaction described hereinabove, resulting in a 1-aryl-3-aroyloxindole of Formula V. The 3-aroyl group can be hydrolyzed with hydrobromic acid in aqueous acetic acid to give a 1-aryloxindole of Formula VI.

The structure of the compounds of Formula V was further indicated by the fact that the compound produced by cyclization of N-benzoyl-2-carbomethoxymethyldiphenylamine was identical with authentic 1-phenyl-3-benzoyloxindole produced by reacting 1-phenyloxindole with ethyl benzoate in the presence of sodium ethoxide.

In the cyclization reaction IV→V small amounts of high melting by-products were formed. It was determined that they had the following structure:

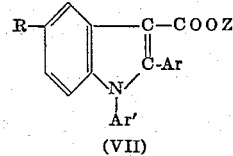

wherein R, Ar and Ar' have the meanings given above, and Z is hydrogen or lower-alkyl. The compounds where Z is hydrogen are produced by hydrolysis of the corresponding lower-alkyl esters. The structure VII was proved by independent synthesis. Ethyl benzoylacetate was condensed with N,N-diphenylhydrazine and the product, $(C_6H_5)_2N-N=C(C_6H_5)CH_2COOC_2H_5$, was converted to VII (Ar, Ar'=$C_6H_5$, R=H, Z=$C_2H_5$) by the Fischer indole synthesis. Saponification gave the acid (Z=H) which was treated with thionyl chloride and then methanol to give the methyl ester (Z=$CH_3$). The last proved to be identical with the by-product obtained by cyclization of IV (Ar, Ar'=$C_6H_5$, R=H, lower-alkyl=$CH_3$).

The compounds of Formula V are beta-dicarbonyl compounds and thus possess an active hydrogen at the 3-position of the indole ring. Consequently, they are acidic, soluble in aqueous alkali, and form metal salts with strong inorganic bases. These salts are the equivalents of the free acids specifically claimed. Preferred types of salts are those which are non-toxic and water-soluble, such as the sodium or potassium salts, although other salts, for example, the lead, calcium and morpholine salts are useful in purification and characterization of the free acids.

Similarly, the compounds of Formula VII where Z is hydrogen are acids and form salts with strong inorganic or organic bases. Again, said salts are the equivalents of the free acids specifically claimed.

Pharmacological evaluation of compounds of Formulas V and VI has shown that they possess pharmacodynamic activity, for example, hypotensive activity. Chemotherapeutic evaluation has demonstrated that compounds of Formula VII possess antibacterial activity.

The following examples will further illustrate the invention without the latter being limited thereto.

A. IMINO CHLORIDES (II)

Example A1

(a) *Methyl 2-benzamidophenylacetate* [I; R is H, Ar is $C_6H_5$, lower-alkyl is $CH_3$].

Methyl o-nitrophenylacetate, prepared in 95% yield from the free acid and methanolic hydrogen chloride, was hydrogenated in methanol with a platinum catalyst. The solvent was then removed at room temperature to give a residue of crude methyl o-aminophenylacetate as an orange oil. The latter was then caused to react with benzoyl chloride in pyridine to yield methyl 2-benzamidophenylacetate.

(b) *Imino chloride* [II; R is H, Ar is $C_6H_5$, lower-alkyl is $CH_3$].

Methyl 2-benzamidophenylacetate (56.5 g., 0.21 mole) and 43.7 g. (0.21 mole) of phosphorus pentachloride were mixed, and a spontaneous reaction occurred. The reaction was completed by heating the mixture on a steam bath until the evolution of hydrogen chloride ceased. The phosphorus oxychloride which had formed was then removed in vacuo at 50° C., and the last traces were removed by codistillation with toluene. The imino chloride was obtained as a red oil.

Example A2

(a) *Ethyl 2-benzamidophenylacetate* [I; R is H, Ar is $C_6H_5$, lower-alkyl is $C_2H_5$] was prepared by hydrogenating ethyl o-nitrophenylacetate with platinum in absolute ethanol and reacting the resulting product with benzoyl chloride in pyridine.

(b) *The imino chloride* [II; R is H, Ar is $C_6H_5$, lower-alkyl is $C_2H_5$] was prepared from 51 g. of ethyl 2-benzamidophenylacetate and phosphorus pentachloride according to the manipulative procedure described above in Example A1, part (b).

Example A3

(a) *Methyl 2-benzamido-4-methoxyphenylacetate* [I; R is $CH_3O$, Ar is $C_6H_5$, lower-alkyl is $CH_3$] can be prepared from the known 2-amino-5-methoxyphenylacetic acid by esterification with methanolic hydrogen chloride and acylation with benzoyl chloride in pyridine.

(b) *The imino chloride* [II; R is $CH_3O$, Ar is $C_6H_5$, lower-alkyl is $CH_3$] can be prepared from methyl 2-benzamido-4-methoxyphenylacetate and phosphorus pentachloride according to the manipulative procedure described above in Example A1, part (b).

Example A4

(a) *Methyl 2 - (3 - bromobenzamido)phenylacetate* [I; R is H, Ar is $3\text{-}BrC_6H_4$, lower-alkyl is $CH_3$] can be prepared by replacing the benzoyl chloride in Example A1, part (a) by 3-bromobenzoyl chloride.

(b) *The imino chloride* [II; R is H, Ar is $3\text{-}BrC_6H_4$, lower-alkyl is $CH_3$] can be prepared by reacting methyl 2-(3-bromobenzamido)phenylacetate with phosphorus pentachloride according to the manipulative procedure described above in Example A1, part (b).

Example A5

(a) *Methyl 2 - (2 - bromo - 3,5 - dichlorobenzamido) phenylacetate* [I; R is H, Ar is $2\text{-Br-}3,5\text{-Cl}_2C_6H_2$, lower-alkyl is $CH_3$] can be prepared by replacing the benzoyl chloride in Example A1, part (a) by 2-bromo-3,5-dichlorobenzoyl chloride.

(b) *The imino chloride* [II; R is H, Ar is $$2\text{-Br-}3,5\text{-Cl}_2C_6H_2$$

lower-alkyl is $CH_3$] can be prepared by reacting methyl 2-(2-bromo - 3,5 - dichlorobenzamido)phenylacetate with phosphorus pentachloride according to the manipulative procedure described above in Example A1, part (b).

Example A6

(a) *Methyl 2 - (4 - butoxybenzamido)phenylacetate* [I; R is H, Ar is $4\text{-}(C_4H_9)C_6H_4$, lower-alkyl is $CH_3$] can be prepared by replacing the benzoyl chloride in Example A1, part (a) by 4-butoxybenzoyl chloride.

(b) *The imino chloride* [II; R is H, Ar is $$4\text{-}(C_4H_9)C_6H_4$$

lower-alkyl is $CH_3$] can be prepared by reacting methyl 2-(4-butoxybenzamido)phenylacetate with phosphorus pentachloride according to the manipulative procedure described above in Example A1, part (b).

Example A7

(a) *Methyl 2-(4-chlorobenzamido)phenylacetate* [I; R is H, Ar is $4\text{-ClC}_6H_4$, lower-alkyl is $CH_3$] can be prepared by replacing the benzoyl chloride in Example A1, part (a) by 4-chlorobenzoyl chloride.

(b) *The imino chloride* [II; R is H, Ar is $4\text{-ClC}_6H_4$, lower-alkyl is $CH_3$] can be prepared by reacting methyl 2 - (4 - chlorobenzamido)phenylacetate with phosphorus pentachloride according to the manipulative procedure described above in Example A1, part (b).

Example A8

(a) *Methyl 2-(5-chloro-3,4-dinitrobenzamido)phenylacetate* [I; R is H, Ar is $5\text{-Cl-}3,4\text{-}(NO_2)_2C_6H_2$, lower-alkyl is $CH_3$] can be prepared by replacing the benzoyl chloride in Example A1, part (a) by 5-chloro-3,4-dinitrobenzoyl chloride.

(b) *The imino chloride* [II; R is H, Ar is $5\text{-Cl-}3,4\text{-}(NO_2)_2C_6H_2$, lower-alkyl is $CH_3$] can be prepared by reacting methyl 2-(5-chloro-3,4-dinitrobenzamido)phenylacetate with phosphorus pentachloride according to the manipulative procedure described above in Example A1, part (b).

Example A9

(a) *Methyl 2 - (2,3-diethoxybenzamido)phenylacetate* [I; R is H, Ar is $2,3\text{-}(C_2H_5O)_2C_6H_3$, lower-alkyl is $CH_3$] can be prepared by replacing the benzoyl chloride in Example A1, part (a) by 2,3-diethoxybenzoyl chloride.

(b) *The imino chloride* [II; R is H, Ar is $2,3\text{-}(C_2H_5O)_2C_6H_3$, lower-alkyl is $CH_3$] can be prepared by reacting methyl 2-(2,3-diethoxybenzamido)phenylacetate with phosphorus pentachloride according to the manipulative procedure described above in Example A1, part (b).

Example A10

(a) *Methyl 2-(3-fluorobenzamido)phenylacetate* [I; R is H, Ar is $3\text{-FC}_6H_4$, lower-alkyl is $CH_3$] can be prepared by replacing the benzoyl chloride in Example A1, part (a) by 3-fluorobenzoyl chloride.

(b) *The imino chloride* [II; R is H, Ar is $3\text{-FC}_6H_4$, lower-alkyl is $CH_3$] can be prepared by reacting methyl 2-(3-fluorobenzamido)phenylacetate with phosphorus pentachloride according to the manipulative procedure described above in Example A1, part (b).

Example A11

(a) *Methyl 2-(4-iodobenzamido)phenylacetate* [I; R is H, Ar is $4\text{-IC}_6H_4$, lower-alkyl is $CH_3$] can be prepared by replacing the benzoyl chloride in Example A1, part (a) by 4-iodobenzoyl chloride.

(b) *The imino chloride* [II; R is H, Ar is 4-$IC_6H_4$, lower-alkyl is $CH_3$] can be prepared by reacting methyl 2-(4-iodobenzamido)phenylacetate with phosphorus pentachloride according to the manipulative procedure described above in Example A1, part (b).

*Example A12*

(a) *Methyl 2 - (3-methylthiobenzamido)phenylacetate* [I; R is H, Ar is 3-$CH_3SC_6H_4$, lower-alkyl is $CH_3$] can be prepared by replacing the benzoyl chloride in Example A1, part (a) by 3-methylthiobenzoyl chloride.

(b) *The imino chloride* [II; R is H, Ar is 3-$CH_3SC_6H_4$, lower-alkyl is $CH_3$] can be prepared by reacting methyl 2-(3-methylthiobenzamido)phenylacetate with phosphorus pentachloride according to the manipulative procedure described above in Example A1, part (b).

*Example 13*

(a) *Methyl 2-(2,4,6-trimethylbenzamido)phenylacetate* [I; R is H, Ar is 2,4,6-$(CH_3)_3C_6H_2$, lower-alkyl is $CH_3$] can be prepared by replacing the benzoyl chloride in Example A1, part (a) by 2,4,6-trimethylbenzoyl chloride.

(b) *The imino chloride* [II; R is H, Ar is 2,4,6-$(CH_3)_3C_6H_2$, lower-alkyl is $CH_3$] can be prepared by reacting methyl 2-(2,4,6-trimethylbenzamido)phenylacetate with phosphorus pentachloride according to the manipulative procedure described above in Example A1, part (b).

*Example A14*

(a) *Methyl 2 - (triflouromethylbenzamido)phenylacetate* [I; R is H, Ar is 4-$F_3CC_6H_4$, lower-alkyl is $CH_3$] can be prepared by replacing the benzoyl chloride in Example A1, part (a) by 4-fluoromethylbenzoyl chloride.

(b) *The imino chloride* [II; R is H, Ar is 4-$F_3CC_6H_4$, lower-alkyl is $CH_3$] can be prepared by reacting methyl 2-(trifluoromethylbenzamido)phenylacetate with phosphorus pentachloride according to the manipulative procedure described above in Example A1, part (b).

*Example A15*

(a) *Methyl 2 - (2-carbomethoxybenzamido)phenylacetate* [I; R is H, Ar is 2-$(CH_3OOC)C_6H_4$, lower alkyl is $CH_3$] can be prepared by replacing the benzoyl chloride in Example A1, part (a) by 2-carbomethoxybenzoyl chloride.

(b) *The imino chloride* [II; R is H, Ar is 2-$(CH_3OOC)C_6H_4$, lower-alkyl is $CH_3$] can be prepared by reacting methyl 2-(2-carbomethoxybenzamido)phenylacetate with phosphorus pentachloride according to the manipulative procedure described above in Example A1, part (b).

B. N[2-(CARBO-LOWER-ALKOXYMETHYL) PHENYL]BENZIMINO ARYL ETHERS (III)

*Example B1*

*N - [2 - (carbomethoxymethyl)phenyl]benzimino 2-carbomethoxyphenyl ether* [III; R is H, Ar is $C_6H_5$, Ar' is 2-$(CH_3OOC)C_6H_4$, lower-alkyl is $CH_3$].

A solution of 12.4 g. (0.23 mole) of sodium methoxide in 200 ml. of methanol was flushed with nitrogen and cooled in an ice bath. Methyl salicylate (35.0 g., 0.23 mole) in 50 ml. of methanol was then added quickly with stirring. A solution of the imino chloride from Example A1, part (a) in 65 ml. of absolute ether was then added during five minutes, and the mixture was stirred for three hours at room temperature. Water was added and the product was extracted with ether. The red organic solution was dried and the solvent removed to leave an oil which was crystallized from a methanol-hexane mixture to give 59.2 g. of N - [2 - (carbomethoxymethyl)phenyl] benzimino 2-carbomethoxyphenyl ether, which when recrystallized twice from methanol gave a sample having the M.P. 62.2–65.2° C. (corr.); ultraviolet maxima at 228 and 278 m$\mu$ (E=24,000 and 5,400). Infrared bands were present at 5.80 and 5.97$\mu$.

*Anal.*—Calcd. for $C_{24}H_{21}NO_5$: C, 71.45; H, 5.25; O, 19.83. Found: C, 71.16; H, 5.40; O, 19.80.

*Example B2*

*N - [2 - (Carbethoxymethyl)phenyl]benzimino 2 - carbomethoxyphenyl ether* [III; R is H, Ar is $C_6H_5$, Ar' is 2-$(CH_3OOC)B_6H_4$, lower-alkyl is $C_2H_5$] was prepared from 10.8 g. of sodium methoxide in 205 ml. of methanol. 34.4 g. of methyl salicylate in 50 ml. of methanol and the imino chloride from Example A2, part (b) in 50 ml. of anhydrous ether according to the manipulative procedure described above in Example B1. The resulting crude oil was crystallized from absolute ethanol to give 47.2 g. of N-[2-(carbethoxymethyl)-phenyl]benzimino 2-carbomethoxyphenyl ether which after two recrystallizations from absolute ethanol had the M.P. 92.5–96° C. (corr.); ultraviolet maxima at 225 and 278 m$\mu$ (E=27,600 and 4,800). Infrared peaks were present in 5.82 and 5.99$\mu$.

*Anal.*—Calcd. for $C_{25}H_{23}NO_5$: C, 71.93; H, 5.55; N, 3.36. Found: C, 71.83; H, 5.52; N, 3.34.

*Example B3*

*N - [2 - (carbomethoxymethyl) - 4 - methoxyphenyl]-benzimino 2-carbomethoxyphenyl ether* [III; R is $OCH_3$, Ar is $C_6H_5$, Ar' is 2-$(CH_3OOC)C_6H_4$, lower-alkyl is $CH_3$] can be prepared from the imino chloride of Example A3, part (b) and methyl salicylate according to the manipulative procedure described above in Example B1.

*Example B4*

*N-[2-(carbomethoxymethyl)phenyl]benzimino phenyl ether* [III; R is H, Ar and Ar' are $C_6H_5$, lower-alkyl is $CH_3$] can be prepared from the imino chloride of Example A1, part (b) and phenol according to the manipulative procedure described above in Example B1.

*Example B5*

*N - [2 - (carbomethoxymethyl)phenyl] - 3 - bromobenzimino 4-chlorophenyl ether* [III; R is H, Ar is 3-$BrC_6H_4$, Ar' is 4-$ClC_6H_4$, lower-alkyl is $CH_3$] can be prepared from the imino chloride of Example A4, part (b) and 4-chlorophenol according to the manipulative procedure described above in Example B1.

*Example B6*

*N - [2 - (carbomethoxymethyl)phenyl] - 2 - bromo-3,5-dichlorobenzimino 2,4-dichlorophenyl ether* [III; R is H, Ar is 2-Br-3,5-$Cl_2C_6H_2$, Ar' is 2,4-$Cl_2C_6H_3$, lower-alkyl is $CH_3$] can be prepared from the imino chloride of Example A5, part (b) and 2,4-dichlorophenol according to the manipulative procedure described above in Example B1.

*Example B7*

*N - [2 - (carbomethoxymethyl)phenyl] - 4 - butoxybenzimino 4-bromophenyl ether* [III; R is H, Ar is 4-$(C_4H_9)C_6H_4$, Ar' is 4-$BrC_6H_4$, lower-alkyl is $CH_3$] can be prepared from the imino chloride of Example A6, part (b) and 4-bromophenol according to the manipulative procedure described above in Example B1.

*Example B8*

*N - [2 - (carbomethoxymethyl)phenyl] - 4 - chlorobenzimino 4-fluorophenyl ether* [III; R is H, Ar is 4-$ClC_6H_4$, Ar' is 4-$FC_6H_4$, lower-alkyl is $CH_3$] can be prepared from the imino chloride of Example A7, part (b) and 4-fluorophenol according to the manipulative procedure described above in Example B1.

*Example B9*

*N - [2 - (carbomethoxymethyl)phenyl] - 5 - chloro-3,4-dinitrobenzimino 4-iodophenyl ether* [III; R is H, Ar is 5-Cl-3,4-$(NO_2)_2C_6H_2$, Ar' is 4-$IC_6H_4$, lower-alkyl is $CH_3$] can be prepared from the imino chloride of Example A8, part (b) and 4-iodophenol according to the manipulative procedure described above in Example B1.

Example B10

N - [2 - (carbomethoxymethyl)phenyl] - 2,3 - diethoxybenzimino 4-methylphenyl ether [III; R is H, Ar is 2,3-$(C_2H_5O)_2C_6H_3$, Ar' is 4-$CH_3C_6H_4$, lower-alkyl is $CH_3$] can be prepared from the imino chloride of Example A9, part (b) and p-cresol according to the manipulative procedure described above in Example B1.

Example B11

N - [2 - (carbomethoxymethyl)phenyl] - 3 - fluorobenzimino 2,4-dimethylphenyl ether [III; R is H, Ar is 3-$FC_6H_4$, Ar' is 2,4-$(CH_3)_2C_6H_3$, lower-alkyl is $CH_3$] can be prepared from the imino chloride of Example A10, part (b) and 2,4-dimethylphenol according to the manipulative procedure described above in Example B1.

Example B12

N - [2 - (carbomethoxymethyl)phenyl] - 4 - iodobenzimino 4-methoxyphenyl ether [III; R is H, Ar is 4-$IC_6H_4$, Ar' is 4-$CH_3OC_6H_4$, lower-alkyl is $CH_3$] can be prepared from the imino chloride of Example A11, part (b) and 4-methoxyphenol according to the manipulative procedure described above in Example B1.

Example B13

N - [2 - (carbomethoxymethyl)phenyl] - 3 - methylthiobenzimino 3,4-dimethoxyphenyl ether [III; R is H, Ar is 3-$CH_3SC_6H_4$, Ar' is 3,4-$(CH_3O)_2C_6H_3$, lower-alkyl is $CH_3$] can be prepared from the imino chloride of Example A12, part (b) and 3,4-dimethoxyphenol according to the manipulative procedure described above in Example B1.

Example B14

N - [2 - (carbomethoxymethyl)phenyl] - 2,4,6 - trimethylbenzimino 3,4,5-trimethoxyphenyl ether [III; R is H, Ar is 2,4,6-$(CH_3)_3C_6H_2$, Ar' is 3,4,5-$(CH_3O)_3C_6H_2$, lower-alkyl is $CH_3$] can be prepared from the imino chloride of Example A13, part (b) and 3,4,5-trimethoxyphenol according to the manipulative procedure described above in Example B1.

Example B15

N - [2 - (carbomethoxymethyl)phenyl] - 4 - trifluoromethylbenzimino 3-methoxy-4-chlorophenyl ether [III; R is H, Ar is 4-$F_3CC_6H_4$, Ar' is 3-$CH_3O$-4-$ClC_6H_3$, lower-alkyl is $CH_3$] can be prepared from the imino chloride of Example A14, part (b) and 3-methoxy-4-chlorophenol according to the manipulative procedure described above in Example B1.

Example B16

N - [2 - (carbomethoxymethyl)phenyl] - 2 - carbomethoxybenzimino 4-methylthiophenyl ether [III; R is H, Ar is 2-$(CH_3OOC)C_6H_4$, Ar' is 4-$CH_3SC_6H_4$, lower-alkyl is $CH_3$] can be prepared from the imino chloride of Example A15, part (b) is 4-methylmercaptophenol according to the manipulative procedure described above in Example B1.

Example B17

N - [2 - (carbomethoxymethyl)phenyl]benzimino 4-nitrophenyl ether [III; R is H, Ar is $C_6H_5$, Ar' is 4-$O_2NC_6H_4$, lower-alkyl is $CH_3$] can be prepared from the imino chloride of Example A1, part (b) and 4-nitrophenol according to the manipulative procedure described above in Example B1.

Example B18

N - [2-(carbomethoxymethyl)phenyl]benzimino 4-trifluoromethylphenyl ether [III; R is H, Ar is $C_6H_5$, Ar' is 4-$F_3CC_6H_4$, lower-alkyl is $CH_3$] can be prepared from the imino chloride of Example A1, part (b) and 4-trifluoromethylphenol according to the manipulative procedure described above in Example B1.

C. N-AROYL-2-CARBO-LOWER-ALKOXYMETHYL-DIARYLAMINES (IV)

Example C1

N - benzoyl-2-carbomethoxymethyl-2'-carbomethoxydiphenylamine [IV; R is H, Ar is $C_6H_5$, Ar' is $$2-(CH_3OOC)C_6H_4$$

lower-alkyl is $CH_3$]

N-[2-(carbomethoxymethyl)phenyl]benzimino 2-carbomethoxyphenyl ether (39.2 g.) (Example B1) was heated at 280–295° C. for twelve minutes. The red gum which resulted was crystallized from methanol to give 32.6 g. (83%) of N-benzoyl-2-carbomethoxymethyl-2'-carbomethoxydiphenylamine, M.P. 117.0–121.8° C. (corr.) after two recrystallizations from methanol. The ultraviolet spectrum exhibited maxima at 250, 280 and 300 m$\mu$ (E=13,070, 6,910 and 5,490). Infrared absorption occurred at 5.79 and 6.06$\mu$.

Anal.—Calcd. for $C_{24}H_{21}NO_5$: C, 71.45; H, 5.25; O, 19.83. Found: C, 71.67; H, 5.34; O, 19.70.

Example C2

N - benzoyl - 2-carbethoxymethyl-2'-carbomethoxydiphenylamine [IV; R is H, Ar is $C_6H_5$, Ar' is $$2-(CH_3OOC)C_6H_4$$

lower-alkyl is $C_2H_5$].

N - [2-(carbethoxymethyl)phenyl]benzimino 2-carbomethoxyphenyl ether (27.2 g.) (Example B2) was heated at 280–295° C. for twelve minutes and the product crystallized from absolute ethanol to give 24.8 g. (91%) of N-benzoyl-2-carbethoxymethyl-2'-carbomethoxydiphenylamine, M.P. 114.5–116° C. (corr.) after two recrystallizations from ethanol. The ultraviolet spectrum exhibited maxima at 280 and 294 m$\mu$ (E=6,500 and 5,500). Infrared absorption occurred at 5.75, 5.81 and 6.04$\mu$.

Anal.—Calcd. for $C_{25}H_{23}NO_5$: C, 71.93; H, 5.55; N, 3.36; O, 19.16. Found: C, 72.07; H, 5.60; N, 3.19; O, 19.20.

Example C3

N - benzoyl-2-carbomethoxymethyl-4-methoxy-2'-carbomethoxydiphenylamine [IV; R is $OCH_3$, Ar is $C_6H_5$, Ar' is 2-$(CH_3OOC)C_6H_4$, lower-alkyl is $CH_3$] can be prepared by heating N-[2-(carbomethoxymethyl)phenyl]benzimino phenyl ether (Example B3) as described above in Example C1.

Example C4

N - benzoyl-2-carbomethoxymethyldiphenylamine [IV; R is H, Ar and Ar' are $C_6H_5$, lower-alkyl is $CH_3$] can be prepared by heating N-[2-(carbomethoxymethyl)phenyl]benzimino phenyl ether (Example B4) as described above in Example C1.

It is obtained in the form of colorless prisms, M.P. 132.5–134.5° C., when crystallized from absolute ethanol. The ultraviolet spectrum has maxima at 234 and 271 m$\mu$ (E=15,500 and 7,900), and infrared bands are present at 5.78 and 6.04$\mu$.

Example C5

N - (3-bromobenzoyl)-2-carbomethoxymethyl-4'-chlorodiphenylamine [IV; R is H, Ar is 3-$BrC_6H_4$, Ar' is 4-$ClC_6H_4$, lower-alkyl is $CH_3$] can be prepared by heating N - [2-(carbomethoxymethyl)phenyl]-3-bromobenzimino 4-chlorophenyl ether (Example B5) as described above in Example C1.

Example C6

N - (2 - Bromo-3,5-dichlorobenzoyl)-2-carbomethoxymethyl-2',4'-dichlorodiphenylamine [IV; R is H, Ar is 2-Br-3,5-$Cl_2C_6H_2$, Ar' is 2,4-$Cl_2C_6H_3$, lower-alkyl is, $CH_3$] can be prepared by heating N-[2-(carbomethoxymethyl)phenyl] - 2-bromo-3,5-dichlorobenzimino 2,4-dichlorophenyl ether (Example B6) as described above in Example C1.

Example C7

N - (4-butoxybenzoyl)-2-carbomethoxymethyl-4'-bromodiphenylamine [IV; R is H, Ar is 4-($C_4H_9$)$C_6H_4$, Ar' is 4-Br$C_6H_4$, lower-alkyl is $CH_3$] can be prepared by heating N - [2-(carbomethoxymethyl)phenyl]-4-butoxybenzimino 4-bromophenyl ether (Example B7) as described above in Example C1.

Example C8

N - (4-chlorobenzoyl)-2-carbomethoxymethyl-4'-fluorodiphenylamine [IV; R is H, Ar is 4-Cl$C_6H_4$, Ar' is 4-F$C_6H_4$, lower-alkyl is $CH_3$] can be prepared by heating N - [2-(carbomethoxymethyl)phenyl]-4-chlorobenzimino 4-fluorophenyl ether (Example B8) as described above in Example C1.

Example C9

N - (5 - chloro-3,4-dinitrobenzoyl)-2-carbomethoxymethyl-4'-iododiphenylamine [IV; R is H, Ar is 5-Cl-3,4-($NO_2$)$_2C_6H_2$, Ar' is 4-I$C_6H_4$, lower-alkyl is $CH_3$] can be prepared by heating N-[2-(carbomethoxymethyl)phenyl]-5-chloro-3,4-dinitrobenzimino 4-iodophenyl ether (Example B9) as described above in Example C1.

Example C10

N - (2,3-diethoxybenzoyl)-2-carbomethoxymethyl-4'-methyldiphenylamine [IV; R is H, Ar is 2,3-($C_2H_5O$)$_2C_6H_3$ Ar' is 4-$CH_3C_6H_4$, lower-alkyl is $CH_3$] can be prepared by heating N - [2-(carbomethoxymethyl)phenyl]-2,3-diethoxybenzimino 4-methylphenyl ether (Example B10) as described above in Example C1.

Example C11

N - (3-fluorobenzoyl)-2-carbomethoxymethyl-2',4'-dimethyldiphenylamine [IV; R is H, Ar is 3-F$C_6H_4$, Ar' is 2,4-($CH_3$)$_2C_6H_3$, lower-alkyl is $CH_3$] can be prepared by heating N - [2-(carbomethoxymethyl)-phenyl]-3-fluorobenzimino 2,4-dimethylphenyl ether (Example B11) as described above in Example C1.

Example C12

N - (4 - iodobenzoyl)-2-carbomethoxymethyl-4'-methoxydiphenylamine [IV; R is H, Ar is 4-I$C_6H_4$, Ar' is 4-$CH_3OC_6H_4$, lower-alkyl is $CH_3$] can be prepared by heating N-[2-(carbomethoxymethyl)phenyl]-4-iodobenzimino 4-methoxyphenyl ether (Example B12) as described above in Example C1.

Example C13

N - (3-methylthiobenzoyl)-2-carbomethoxymethyl-3',4'-dimethoxydiphenylamine [IV; R is H, Ar is

3-$CH_3SC_6H_4$

Ar' is 3,4-($CH_3O$)$_2C_6H_3$, lower-alkyl is $CH_3$] can be prepared by heating N-[2-(carbomethoxymethyl)phenyl]-3-methylthiobenzimino 3,4-dimethoxyphenyl ether (Example B13) as described above in Example C1.

Example C14

N - (2,4,6-trimethylbenzoyl) - 2 - carbomethoxymethyl-3',4',5'-trimethoxydiphenylamine [IV; R is H, Ar is 2,4,6-($CH_3$)$_3C_6H_2$, Ar' is 3,4,5-($CH_3O$)$_3C_6H_2$, lower-alkyl is $CH_3$] can be prepared by heating N-[2-(carbomethoxymethyl)phenyl] - 2,4,6 - trimethylbenzimino 3,4,5 - trimethoxyphenyl ether (Example B14) as described above in Example C1.

Example C15

N - (4 - trifluoromethylbenzoyl) - 2 - carbomethoxymethyl-3'-methoxy-4'-chlorodiphenylamine [IV; R is H, Ar is 4-$F_3CC_6H_4$, Ar' is 3-$CH_3O$-4-Cl$C_6H_3$, lower-alkyl is $CH_3$] can be prepared by heating N-[2-(carbomethoxymethyl)phenyl]-4-trifluoromethylbenzimino 3-methoxy-4-chlorophenyl ether (Example B15) as described above in Example C1.

Example C16

N - (2-carbomethoxybenzoyl) - 2 - carbomethoxymethyl - 4' - methylthiodiphenylamine [IV; R is H, Ar is 2-($CH_3OOC$)$C_6H_4$, Ar' is 4-$CH_3SC_6H_4$, lower-alkyl is $CH_3$] can be prepared by heating N-[2-(carbomethoxymethyl)phenyl]-2-carbomethoxybenzimino 4-methylthiophenyl ether (Example B16) as described above in Example C1.

Example C17

N - benzoyl - 2 - carbomethoxymethyl - 4' - nitrodiphenylamine [IV; R is H, Ar is $C_6H_5$, Ar' is 4-$O_2NC_6H_4$, lower-alkyl is $CH_3$] can be prepared by heating N-[2-(carbomethoxymethyl)phenyl]benzimino 4 - nitrophenyl ether (Example B17) as described above in Example C1.

Example C18

N - benzoyl - 2 - carbomethoxymethyl - 4' - trifluoromethyldiphenylamine [IV; R is H, Ar is $C_6H_5$, Ar' is 4-$F_3CC_6H_4$, lower-alkyl is $CH_3$] can be prepared by heating N-[2-(carbomethoxymethyl)phenyl]benzimino 4-trifluoromethylphenyl ether (Example B18) as described above in Example C1.

D. 1-ARYL-3-AROYLOXINDOLES (V) AND 1,2-DIARYL-3-INDOLECARBOXYLIC ACIDS (VII)

Example D1

3 - benzoyl - 1 - (2 - carbomethoxyphenyl)oxindole [V; R is H, Ar is $C_6H_5$, Ar' is 2-($CH_3OOC$)$C_6H_4$] and 1-(2-carbomethoxyphenyl) - 2 - phenyl-3-indolecarboxylic acid [VII; R is H, Ar is $C_6H_5$, Ar' is 2-($CH_3OOC$)$C_6H_4$, Z is H].

Sodium methoxide (2.7 g., 0.050 mole) was added to a stirred mixture of 19.0 g. (0.047 mole) of N-benzoyl-2-carbomethoxymethyl-2'-carbomethoxydiphenylamine (Example C1) in 125 ml. of hot benzene in a nitrogen atmosphere. The solution was then refluxed for one hour with continuous removal of solvent. Dry benzene was added from time to time to prevent the volume of the solution from falling below 50 ml. The red solution was cooled in an ice bath, and water and excess hydrochloric acid were added. The mixture was extracted with ether, and the ether solution was dried and concentrated to leave a solid residue which was recrystallized from methanol. There was thus obtained 12.6 g. (72%) of 3-benzoyl-1-(2-carbomethoxyphenyl)-oxindole as an orange solid, M.P. 136–138° C. (uncorr.). The analytical sample was obtained after two recrystallizations from methanol, light yellow, M.P. 135.2–138.0° C. (corr.). The compound gave a dark green color with ferric chloride and had ultraviolet maxima at 268 and 320 m$\mu$ (E=12,600 and 11,300). A chloroform solution showed infrared bands at 5.80, 6.07 and 6.15$\mu$, while the spectrum of the material in potassium bromide had peaks at 5.77, 6.10 and 6.15$\mu$.

*Anal.*—Calcd. for $C_{23}H_{17}NO_4$: C, 74.38; H, 4.61; N, 3.77; O, 17.23. Found: C, 74.56; H, 4.90; N, 3.74; O, 17.10.

3 - benzoyl - 1 - (2 - carbomethoxyphenyl)oxindole was found to have a minimum effective hypotensive dose of about 0.10 mg./kg. of body weight when injected subcutaneously into renal hypertensive rats and measured by the photoelectric foot method of Kersten et al., J. Lab. Clin. Med. 32, 1090 (1947).

3-benzoyl-1-(2-carbomethoxyphenyl)oxindole is soluble in aqueous sodium or potassium hydroxide, forming solutions of the sodium or potassium salt, respectively.

While the procedure just described gave reasonably pure material after one recrystallization, a similar experiment in which toluene rather than benzene was used as the reaction medium furnished material which melted over a very wide range. When this material was boiled with a large volume of cyclohexane all but a very small fraction of the solid dissolved. 3-benzoyl-1-(2-carbomethoxyphenyl)oxindole was obtained from the yellow solution while the colorless, insoluble material proved to be 1-(2-carbomethoxyphenyl)-2-phenyl-3-indolecarboxylic acid. The latter compound had the M.P. 253–258° C. (uncorr.) and gave a negative ferric chloride test. It was further purified by dissolving it in aqueous sodium bicarbonate solution and reprecipitating it with acid. One recrystallization from methanol gave the analytical sample, M.P. 254–260° C. (corr.). The ultra violet spectrum had maxima at 235 and 294 m$\mu$ (E=30,690 and 16,550). The infrared spectrum had bands at 5.80, 5.92 and 6.03$\mu$.

*Anal.*—Calcd. for $C_{23}H_{17}NO_4$: C, 74.38; H, 4.61; N, 3.77. Found: C, 75.11; H, 4.75; N, 3.77. Molecular weight calcd.: 371. Found: 376.

Example D2

*3 - benzoyl - 1 - (2 - carboxyphenyl)oxindole* [V; R is H, Ar is $C_6H_5$, Ar' is 2-(HOOC)$C_6H_4$].

A solution from 10.0 g. (0.027 mole) of 3-benzoyl-1-(2-carbomethoxyphenyl)oxindole (Example D1), 20 g. of potassium carbonate, 500 ml. of methanol and 120 ml. of water was refluxed for three hours, then diluted with water and washed with ether. The aqueous phase was acidified with hydrochloric acid and the product extracted with ether. The ether solution was dried and concentrated, and the residue was crystallized from a benzene-hexane mixture to give 6.3 g. (66%) of 3-benzoyl-1-(2-carboxyphenyl)oxindole, M.P. 203–207.5° C. (uncorr.). One recrystallization from benzene gave the analytical sample, light yellow solid, M.P. 208.6–210.0° C. (corr.). The compound gave a green color with ferric chloride. The ultraviolet spectrum had maxima at 270 and 321 m$\mu$ (E=11,400 and 11,030). The infrared spectrum had bands at 5.96, 6.09 and 6.12$\mu$.

*Anal.*—Calcd. for $C_{22}H_{15}NO_4$: C, 73.94; H, 4.23; N, 3.92. Found: C, 74.01; H, 4.44; N, 3.91. Neutral equivalent calcd.: 178.7. Found: 183.0.

3-benzoyl-1-(2-carboxyphenyl)oxindole was found to have a minimum effective hypotensive dose of about 1.0 mg./kg. of body weight when injected subcutaneously into renal hypertensive rates and measured by the photoelectric foot method of Kersten et al., loc. cit. The intravenous toxicity ($ALD_{50}$) in the mouse was found to be 300 mg./kg.

Example D3

*3-benzoyl-1-(2-carbethoxyphenyl)oxindole* [V; R is H, Ar is $C_6H_5$, Ar' is 2-$(C_2H_5OOC)C_6H_4$] and *1-(2-carmethoxyphenyl)-2-phenyl-3-indolecarboxylic acid* [VII; R is H, Ar is $C_6H_5$, Ar' is 2-$(C_2H_5OOC)C_6H_4$, Z is H].

The reaction was run under nitrogen with stirring, 2.76 g. (0.12 mole) of sodium being dissolved in absolute ethanol followed by distillation to dryness. The last traces of ethanol were removed by adding toluene and again distilling to dryness. A solution of 43.0 g. (0.103 mole) of N-benzoyl-2-carbethoxymethyl-2'-carbomethoxydiphenylamine (Example C2) in 125 ml. of dry toluene was then added all at once. The resulting clear red solution was refluxed for two hours with continuous distillation of solvent and addition of fresh, dry toluene whenever needed. The work-up was the same as that described for the methyl ester in Example D1 above. The product was recrystallized from absolute ethanol to give 29.0 g. (73%) of 3-benzoyl-1-(2-carbethoxyphenyl)oxindole as a yellow solid, M.P. 134–139° C. (uncorr.). Two recrystallization from ethyl acetate gave a light yellow analytical sample, M.P. 142–144° C. (corr.). The product gave a dark green color with ferric chloride and the ultraviolet spectrum exhibited maxima at 268 and 321 m$\mu$ (E=14,900 and 13,000). The infrared spectrum of the compound in potassium bromide had bands at 5.85, 6.06 and 6.16$\mu$ while a chloroform solution gave bands at 5.83, 6.07 and 6.12$\mu$.

*Anal.*—Calcd. for $C_{24}H_{19}NO_4$: C, 74.79; H, 4.97; N, 3.63. Found: C, 75.44; H, 5.61; N, 3.66.

Concentration of the mother liquors from the recrystallizations of 3-benzoyl-1-(2-carbethoxyphenyl)oxindole gave 2 g. of solid, M.P. 275–279° C. (uncorr.). Two recrystallizations from absolute ethanol gave 1-(2-carbethoxyphenyl)-2-phenyl-3-indolecarboxylic acid, M.P. 278–281° C. (corr.), which gave a negative ferric chloride test. The ultraviolet spectrum had maxima at 237 and 294 m$\mu$ (E=31,100 and 17,340). The infrared spectrum had peaks at 5.80, 5.94 (weak) and 6.05–6.10$\mu$.

*Anal.*—Calcd. for $C_{24}H_{19}NO_4$: C, 74.79; H, 4.97; N, 3.63; O, 16.61. Found: C, 74.75; H, 5.61; N, 3.61; O, 16.80.

Although the products expected from the cyclization of N-benzoyl - 2 - carbethoxymethyl-2'- carbomethoxydiphenylamine would be 1-(2-carbomethoxyphenyl) substituted indoles instead of the 1-(2-carbethoxyphenyl) substituted indoles actually obtained, the result can be explained by transesterification brought about by the use of sodium ethoxide. This was established by the fact that when the sodium methoxide in Example D1 was replaced by sodium ethoxide, an ethyl ester identical with the product of Example D3 was obtained.

Example D4

(a) *3-benzoyl-1-phenyloxindole* [V; R is H, Ar and Ar' are $C_6H_5$] and *methyl 1,2-diphenyl-3-indolecarboxylate* [VII; R is H, Ar and Ar' are $C_6H_5$, Z is $CH_3$].

A reaction was carried out between 1.38 g. of N-benzoyl-2-carbomethoxymethyldiphenylamine [Schulenberg and Archer, J. Am. Chem. Soc. 82, 2037 (1960)] and 270 mg. of sodium methoxide according to the manipulative procedure described above in Example D1. After dilution with water, the reaction mixture was extracted with chloroform to give a neutral fraction. The aqueous solution was acidified and extracted with chloroform, and the chloroform extracts were dried and concentrated. The residual gum was crystallized from isopropyl alcohol to give 420 mg. (34%) of 3-benzoyl-1-phenyloxindole as a tan solid, M.P. 116.6–119.4° C. (corr.). The product gave intense color with ferric chloride, and the ultraviolet spectrum had maxima at 229, 271 and 323 m$\mu$ (E=21,600, 11,500 and 10,100). The infrared spectrum showed bands at 6.05, 6.10 and 6.15$\mu$.

*Anal.*—Calcd. for $C_{21}H_{15}NO_2$: N, 4.47. Found: N, 4.21.

The neutral fraction from the foregoing reaction was crystallized from methanol, using activated charcoal for decolorizing purposes, to give 90 mg. (7%) of methyl 1,2-diphenyl-3-indolecarboxylate. One recrystallization from methanol gave the compound in the form of colorless needles, M.P. 193.5–195° C. (corr.). The product gave no color with ferric chloride and had ultraviolet maxima at 235 and 294 m$\mu$ (E=29,100 and 17,100).

*Anal.*—Calcd. for $C_{22}H_{17}NO_2$: C, 80.71; H, 5.23; N, 4.28. Found: C, 80.46; H, 5.16; N, 4.10.

(b) *Alternative preparation of 3-benzoyl-1-phenyloxindole.*

A sodium ethoxide solution was prepared from 2.3 g. of sodium and 40 ml. of absolute ethanol. To this was added quickly a warm solution from 8.4 g. (0.04 mole) of 1-phenyloxindole, 50 ml. of ethanol and 15 g. (0.1 mole) of ethyl benzoate. The mixture was refluxed for two hours, considerable solid precipitating meanwhile. After cooling and diluting with water, the neutral fraction was extracted with ether and unreacted 1-phenyloxindole recovered. The aqueous solution was then acidified with hydrochloric acid and extracted with ether. The ether extracts were dried and concentrated, and the residue was recrystallized from an ethanol-cyclohexane mixture to give 2.3 g. of 3-benzoyl-1-phenyloxindole as a yellow solid, M.P. 107–114° C. (uncorr.). Two recrystallizations from isopropyl alcohol gave a sample having the M.P. 117.5–120.5° C. (corr.), which was identical with the 3-benzoyl-1-phenyloxindole obtained above in part (a), and having no melting point depression upon admixture.

*Anal.*—Calcd. for $C_{21}H_{15}NO_2$: C, 80.49; H, 4.83; N, 4.47. Found: C, 80.82; H, 4.66; N, 4.45.

(c) *Alternate preparation of methyl 1,2-diphenyl-3-indolecarboxylate.*

(1) *Ethyl 1,2-diphenyl-3-indolecarboxylate* [VII; R is H, Ar and Ar' are $C_6H_5$, Z is $C_2H_5$].

N,N-diphenylhydrazine and ethyl benzoylacetate were converted to its hydrazone according to Hantzsch et al., Chem. Ber. 30, 3009 (1897), and 39 g. (0.11 mole) of the hydrazone was dissolved in 250 ml. of warm absolute ethanol. To this solution was added 250 ml. of ethanol saturated with hydrogen chloride, and the red mixture was boiled for one hour. The reaction mixture was diluted with water and the product was obtained as an insoluble, yellow solid. One recrystallization from ethanol gave 17.5 g. (47%) of ethyl 1,2-diphenyl-3-indolecarboxylate, M.P. 149–150.5° C. (corr.). The ultraviolet spectrum had maxima at 235 and 294 m$\mu$ (E=30,000 to 17,600). Infrared absorption occurred at 5.92$\mu$.

*Anal.*—Calcd. for $C_{23}H_{19}NO_2$: C, 80.91; H, 5.61; N, 4.10. Found: C, 81,03; H, 5.64; N, 4.09.

(2) *1,2-diphenyl-3-indolecarboxylic acid* [VII; R is H, Ar and Ar' are $C_6H_5$, Z is H].

A mixture of 3 g. of ethyl 1,2-diphenyl-3-indolecarboxylate, 25 ml. of 35% aqueous sodium hydroxide, 15 ml. of water and 50 ml. of methanol was refluxed for eighteen hours. The mixture was then cooled and the solid product was filtered. This was the sodium salt of 1,2-diphenyl-3-indolecarboxylic acid, and it was dissolved in hot water and treated with aqueous hydrochloric acid to give 1,2-diphenyl-3-indolecarboxylic acid, M.P. 247.6° C. (corr.) (dec.), after two recrystallizations from acetone. The compound had ultraviolet maxima at 234 and 294 m$\mu$ (E=29,000 and 16,800). The infrared spectrum had a band at 6.05$\mu$.

*Anal.*—Calcd. for $C_{21}H_{15}NO_2$: C, 80.49; H, 4.83; N, 4.47. Found: C, 80.42; H, 4.67; N, 4.40.

A portion of the sodium salt of 1,2-diphenyl-3-indolecarboxylic acid was recrystallized from water to give colorless needles, melting above 300° C.

*Anal.*—Calcd. for $C_{21}H_{14}NO_2Na$: C, 75.21; H, 21; N, 4.18. Found: C, 75.26; H, 4.34; N, 3.99.

The sodium hydroxide in the foregoing procedure can be replaced by potassium hydroxide to give the potassium salt of 1,2-diphenyl-3-indolecarboxylic acid.

1,2-diphenyl-3-indolecarboxylic acid was found to exhibit bacteriostatic activity at dilutions of 1 part in 10,000 when tested against the following organisms: *Staph. aureus, E. typhi, Cl. welchii, Myco. tuberculosis* and *Ps. aeruginosa*.

(3) *Methyl 1,2-diphenyl-3-indolecarboxylate.*

1,2-diphenyl-3-indolecarboxylic acid (1 g.) and 10 ml. of thionyl chloride were mixed, the solution being refluxed for forty-five minutes after the initial reaction had stopped. The excess thionyl chloride was then removed in vacuo, 10 ml. of methanol was added and the mixture refluxed for forty-five minutes. The reaction mixture was cooled and the insoluble product was separated and recrystallized from methanol, using activated charcoal for decolorizing purposes, to give methyl 1,2-diphenyl-3-indolecarboxylate in the form of colorless needles, M.P. 195–196° C. (corr.). The product was identical with the methyl 1,2-diphenyl-3-indolecarboxylate obtained above in part (a), as shown by mixed melting point and ultraviolet and infrared spectra.

*Anal.*—Calcd. for $C_{22}H_{17}NO_2$: C, 80.71; H, 5.23; N, 4.28. Found: C, 80.67; H, 5.10; N, 4.25.

*Example D5*

*3 - benzoyl - 1-(2-carbomethoxyphenyl)-5-methoxyoxindole* [V; R is $CH_3O$, Ar is $C_6H_5$, Ar' is 2-($CH_3OOC$)$C_6H_4$]

and *1-(2-carbomethoxyphenyl)-2-phenyl-5-methoxy-3-indolecarboxylic acid* [VII; R is $CH_3$, Ar is $C_6H_5$, Ar' is 2-($CH_3OOC$)$C_6H_4$, Z is H] can be prepared by heating N - benzoyl - 2-carbomethoxymethyl-4-methoxy-2'-carbomethoxydiphenylamine (Example C3) with sodium methoxide according to the manipulative procedure described above in Example D1.

*Example D6*

*3-(3-bromobenzoyl)-1-(4-chlorophenyl)oxindole* [V; R is H, Ar is 3-Br$C_6H_4$, Ar' is 4-Cl$C_6H_4$] and *1-(4-chlorophenyl)-2-(3-bromophenyl)-3-indolecarboxylic acid* [VII; R is H, Ar is 3-Br$C_6H_4$, Ar' is 4-Cl$C_6H_4$, Z is H] can be prepared my heating N-(3-bromobenzoyl)-2-carbomethoxymethyl-4'-chlorodiphenylamine (Example C5) with sodium methoxide according to the manipulative procedure described above in Example D1.

*Example D7*

*3 - (2 - bromo-3,5-dichlorobenzoyl)-1-(2,4-dichlorophenyl)oxindole* [V; R is H, Ar is 2-Br-3,5-$Cl_2C_6H_2$, Ar' is 2,4-$Cl_2C_6H_3$] and *1-(2,4-dichlorophenyl)-2-(2-bromo-3,5-dichlorophenyl)-3-indolecarboxylic acid* [VII; R is H, Ar is 2-Br-3,5-$Cl_2C_6H_2$, Ar' is 2,4-$Cl_2C_6H_3$, Z is H] can be prepared by heating N-(2-bromo-3,5-dichlorobenzoyl)-2-carbomethoxymethyl-2',4'-dichlorodiphenylamine (Example C6) with sodium methoxide according to the manipulative procedure described above in Example D1.

*Example D8*

*3 - (4-butoxybenzoyl)-1-(4-bromophenyl)oxindole* [V; R is H, Ar is 4-($C_4H_9$)$C_6H_4$, Ar' is 4-Br$C_6H_4$] and *1-(4-bromophenyl) - 2 - (4-butoxyphenyl)-3-indolecarboxylic acid* [VII; R is H, Ar is 4-($C_4H_9$)$C_6H_4$, Ar' is 4-Br$C_6H_4$, Z is H] can be prepared by heating N-(4-butoxybenzoyl)-2-carbomethoxymethyl-4'-bromodiphenylamine (Example C7) with sodium methoxide to the manipulative procedure described above in Example D1.

*Example D9*

*3-(4-chlorobenzoyl)-1-(4-fluorophenyl)oxindole* [V; R is H, Ar is 4-Cl$C_6H_4$, Ar' is 4-F$C_6H_4$] and *1-(4-fluorophenyl)2-(4-chlorophenyl)-3-indolecarboxylic acid* [VII; R is H, Ar is 4-Cl$C_6H_4$, Ar' is 4-F$C_6H_4$, Z is H] can be prepared by heating N - (4-chlorobenzoyl)-2-carbomethoxymethyl-4'-fluorodiphenylamine (Example C8) with sodium methoxide according to the manipulative procedure described above in Example D1.

*Example D10*

*3-(5-chloro-3,4-dinitrobenzoyl) - 1-(4 - iodophenyl)oxindole* [V; R is H, Ar is 5-Cl-3,4-($NO_2$)$_2C_6H_2$, Ar' is 4-I$C_6H_4$] and *1-(4-iodophenyl)-2-(5-chloro-3,4-dinitrophenyl)-3-indolecarboxylic acid* [VII; R is H, Ar is 5-Cl-3,4-($NO_2$)$_2C_6H_2$, Ar' is 4-I$C_6H_4$, Z is H] can be prepared by heating N-(5-chloro-3,4-dinitrobenzoyl)-2-carbomethoxymethyl - 4' - iododiphenylamine (Example C9) with sodium methoxide according to the manipulative procedure described above in Example D1.

*Example D11*

*3-(2,3-diethoxybenzoyl)-1-(4 - methylphenyl)oxindole* [V; R is H, Ar is 2,3-($C_2H_5O$)$_2C_6H_3$, Ar' is 4-$CH_3C_6H_4$] and *1-(4-methylphenyl)-2-(2,3-diethoxyphenyl)-3 - idolecarboxylic acid* [VII; R is H, Ar is 2,3-($C_2H_5O$)$_2C_6H_3$, Ar' is 4-$CH_3C_6H_4$, Z is H] can be prepared by heating N-(2,3 - diethoxybenzoyl) - 2 - carbomethoxymethyl - 4'-methyldiphenylamine (Example C10) with sodium methoxide according to the manipulative procedure described above in Example D1.

Example D12

3-(3-fluorobenzoyl)-1-(2,4 - dimethylphenyl)oxindole [V; R is H, Ar is 3-FC$_6$H$_4$, Ar' is 2,4-(CH$_3$)$_2$C$_6$H$_3$] and 1-(2,4-dimethylphenyl)-2-(3-fluorophenyl)-3 - indolecarboxylic acid [VII; R is H, Ar is 3-FC$_6$H$_4$, Ar' is 2,4-(CH$_3$)$_2$C$_6$H$_3$, Z is H] can be prepared by heating N-(3-fluorobenzoyl)-2-carbomethoxymethyl-2',4' - dimethyl-diphenylamine (Example C11) with sodium methoxide according to the manipulative procedure described above in Example D1.

Example D13

3-(4-iodobenzoyl)-1-(4 - methoxyphenyl)oxindole [V; R is H, Ar is 4-IC$_6$H$_4$, Ar' is 4-CH$_3$OC$_6$H$_4$] and 1-(4-methoxyphenyl)-2-(4-iodophenyl) - 3 - indolecarboxylic acid [VII; R is H, Ar is 4-IC$_6$H$_4$, Ar' is 4-CH$_3$OC$_6$H$_4$, Z is H] can be prepared by heating N-(4-iodobenzoyl)-2-carbomethoxymethyl-4'-methoxydiphenylamine (Example C12) with sodium methoxide according to the manipulative procedure described above in Example D1.

Example D14

3-(3-methylthiobenzoyl) - 1 - (3,4 - dimethoxyphenyl)-oxindole [V; R is H, Ar is 3-CH$_3$SC$_6$H$_4$, Ar' is 3,4-(CH$_3$O)$_2$C$_6$H$_3$] and 1-(3,4-dimethoxyphenyl)-2-(3-methylthiophenyl)-3-indolecarboxylic acid [VII; R is H, Ar is 3-CH$_3$SC$_6$H$_4$, Ar' is 3,4-(CH$_3$O)$_2$C$_6$H$_3$, Z is H] can be prepared by heating N-(3-methylthiobenzoyl)-2-carbomethoxymethyl-3',4'-dimethoxydiphenylamine (Example C13) with sodium methoxide according to the manipulative procedure described above in Example D1.

Example D15

3-(2,4,6-trimethylbenzoyl)-1 - (3,4,5 - trimethoxyphenyl)oxindole [V; R is H, Ar is 2,4,6-(CH$_3$)$_3$C$_6$H$_2$, Ar' is 3,4,5-(CH$_3$O)$_3$C$_6$H$_2$] and 1-(3,4,5-trimethoxyphenyl)-2-(2,4,6-trimethylpheny)-3-indolecarboxylic acid [VII; R is H, Ar is 2,4,6-(CH$_3$)$_3$C$_6$H$_2$, Ar' is 3,4,5-(CH$_3$O)$_3$C$_6$H$_2$, Z is H] can be prepared by heating N-(2,4,6-trimethylbenzoyl)-2-carbomethoxymethyl-3',4',5' - trimethoxydiphenylamine (Example C14) with sodium methoxide according to the manipulative procedure described above in Example D1.

Example D16

3-(4-trifluoromethylbenzoyl)-1-(3-methoxy - 4 - chlorophenyloxindole [V; R is H, Ar is 4-F$_3$CC$_6$H$_4$, Ar' is 3-CH$_3$O-4-ClC$_6$H$_3$] and 1-(3-methoxy-4-chlorophenyl)-2-4-trifluoromethylphenyl) - 3 - indolecarboxylic acid [VII; R is H, Ar is 4-F$_3$CC$_6$H$_4$, Ar' is 3-CH$_3$O-4-ClC$_6$H$_3$, Z is H] can be prepared by heating N-(4-trifluoromethylbenzoyl)-2-carbomethoxymethyl-3'-methoxy - 4' - chloro - diphenylamine (Example C15) with sodium methoxide according to the manipulative procedure described above in Example D1.

Example D17

3-(2-carbomethoxybenzoyl)-1 - (4 - methylthiophenyl)oxindole [V; R is H, Ar is 2-(CH$_3$OC)C$_6$H$_4$, Ar' is 4-CH$_3$SC$_6$H$_4$] and 1-(4-methylthiophenyl) - 2 - (2 - carbomethoxyphenyl)-3-indolecarboxylic acid [VII; R is H, Ar is 2-(CH$_3$OOC)C$_6$H$_4$, Ar' is 4-CH$_3$SC$_6$H$_4$, Z is H] can be prepared by heating N-(2-carbomethoxybenzoyl)-2-carbomethoxy-methyl-4'-methylthiodiphenylamine (Example C16) with sodium methoxide according to the manipulative procedure described above in Example D1.

Example D18

3-benzoyl-1-(4-nitrophenyl)oxindole [V; R is H, Ar is C$_6$H$_5$, Ar' is 4-O$_2$NC$_6$H$_4$] and 1-(4-nitrophenyl)-2-phenyl-3-indolecarboxylic acid [VII; R is H, Ar is C$_6$H$_5$, Ar' is 4-O$_2$NC$_6$H$_4$, Z is H] can be prepared by heating N-benzoyl - 2 - carbomethoxymethyl - 4' - nitrodiphenylamine (Example C17) with sodium methoxide according to the manipulative procedure described above in Example D1.

Example D19

3-benzoyl-1-(4-trifluoromethylphenyl)oxindole [V; R is H, Ar is C$_6$H$_5$, Ar' is 4-F$_3$CC$_6$H$_4$] and 1-(4-trifluoromethylphenyl)-2-phenyl-3-indolecarboxylic acid [VII; R is H, Ar is C$_6$H$_5$, Ar' is 4-F$_3$CC$_6$H$_4$, Z is H] can be prepared by heating N-benzoyl-2 - carbomethoxymethyl - 4' - trifluoromethyldiphenylamine (Example C18) with sodium methoxide according to the manipulative procedure described above in Example D1.

E. 1-ARYLOXINDOLES (VI)

Example E1

(a) o-(2-carboxyanilino)phenylacetic acid.

A solution of 16.1 g. (0.04 mole) of N-benzoyl-2-carbomethoxymethyl - 2' - carbomethoxydiphenylamine (Example C1), 35 g. of potassium hydroxide, 150 ml. of water and 75 ml. of dioxane was refluxed for sixteen hours. The red solution was washed with ether and then acidified with excess hydrochloric acid below 15° C. The gum which formed was extracted with ether, and the ether extracts were dried and concentrated. The residue and recrystallized from ethyl acetate to give o-(2-carboxyanilino)phenylacetic acid, M.P. 187.0–190.6° C. (dec.) (corr.). The ultraviolet spectrum had maxima at 220, 283 and 345 mμ (E=28,700, 9,800 and 7,100), and the infrared spectrum had bands at 3.04 and 5.95μ.

Anal.—Calcd. for C$_{15}$H$_{13}$NO$_4$: C, 66.41; H, 4.83; N, 5.16. Found: C, 66.75; H, 4.76; N, 5.09. Neutral equivalent Calcd.: 135.6. Found: 136.8.

(b) 1-(o-carboxyphenyl)oxindole [VI; R is H, Ar' is 2-(HOOC)C$_6$H$_4$].

A solution of 0.8 g. of o-(2-carboxyanilino)phenylacetic acid, 10 ml. of acetic acid and 10 ml. of 48% hydrobromic acid was refluxed for one-half hour. The reaction mixture was diluted with water, and the resulting solid was separated and recrystallized from ethyl acetate to give 1-(o-carboxyphenyl)oxindole, M.P. 207.8–210.8° C. (corr.). The ultraviolet spectrum had a maximum at 248 mμ (E=11,400), and infrared peaks were present at 5.88 and 6.02μ.

Anal.—Calcd. for C$_{15}$H$_{11}$NO$_3$: C, 71.14; H, 4.37; N, 5.53. Found: C, 71.11; H, 4.80; N, 5.39.

1-(o-carboxyphenyl)oxindole was also obtained by refluxing a solution of 6.8 g. (0.018 mole) of 3-benzoyl-1-(2-carbomethoxyphenyl)oxindole (Example D1), 60 ml. of acetic acid and 60 ml. of 48% hydrobromic acid for one hour. The reaction mixture was diluted with water, and the resulting product was collected and recrystallized from an ethyl acetatehexane mixture, using activated charcoal for decolorizing purposes, to give 1.9 g. of 1-(o-carboxyphenyl)oxindole, M.P. 207.5–209.5° C. The latter was recrystallized from ethyl acetate to yield a sample which was identical, by mixed melting point and infrared and ultraviolet spectra, with the 1-(2-carboxyphenyl)oxindole prepared from 2-(2-carboxy-N-amino) phenylacetic acid, described above.

Anal.—Found: C, 71.43; H, 4.61; N, 5.43.

1-(o-carboxyphenyl)oxindole was found to have a minimum effective hypotensive dose of about 0.1 mg./kg. of body weight when injected subcutaneously into renal hypertensive rats and measured by the photoelectric foot method of Kersten et al., loc. cit.

Example E2

1-(2-carbethoxyphenyl)oxindole [VI; R is H, Ar' is 2-(C$_2$H$_5$OOC)C$_6$H$_4$].

A solution of 4.9 g. (0.013 mole) of 3-benzoyl-1-(2-carbethoxyphenyl)oxindole (Example D3), 40 ml. of ethanol, 30 ml. of concentrated hydrochloric acid and 20 ml. of dioxane was refluxed for twelve hours. Water was added and the mixture was extracted with ether. The ether extracts were washed with aqueous sodium bicarbonate, dried, and concentrated to give a gum which was crystallized from hexane. Two recrystallizations from isopropyl alcohol gave 1-(2-carbethoxyphenyl)oxindole, M.P. 118.5–121.5° C. (corr.). The ultraviolet spectrum had maxima at 228, 246 and 280 mµ (E=14,270, 12,030 and 2,210). The infrared spectrum showed one carbonyl band at 5.82µ.

*Anal.*—Calcd. for $C_{17}H_{15}NO_3$: C, 72.58; H, 5.37; N, 4.98. Found: C, 73.04; H, 5.21; N, 4.70.

*Example E3*

1-(2-carbomethoxyphenyl)-5-methoxyoxindole [VI; R is $CH_3O$, Ar' is 2-$(CH_3OOC)C_6H_4$] can be prepared by heating 3-benzoyl-1-(2-carbomethoxyphenyl)-5-methoxyoxindole (Example D5) with acetic acid and hydrobromic acid according to the manipulative procedure described above in Example E1.

We claim:

1. The process for preparing a compound of the formula

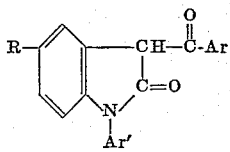

which comprises heating with a strong base at a temperature between 50° C. and 150° C. under anhydrous conditions a compound of the formula

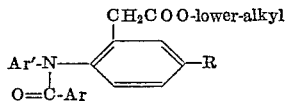

wherein R is a member of the group consisting of hydrogen and lower-alkoxy, and Ar and Ar' each is a member of the group consisting of phenyl and phenyl substituted by from one to three substituents selected from the group consisting of lower-alkyl, lower-alkoxy, lower-alkylmercapto, halogen, carboxy, carbo-lower-alkoxy, nitro and trifluoromethyl; and the strong base is a compound of the formula M–Z wherein M is an alkali metal and Z is a member of the group consisting of lower-alkoxy, amino and hydrogen.

2. The process for preparing a compound of the formula

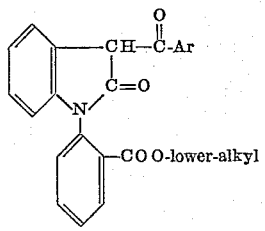

which comprises heating with an alkali metal lower-alkoxide at a temperature between 50° C. and 150° C. under anhydrous conditions a compound of the formula

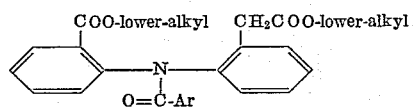

wherein Ar is phenyl.

3. The process for preparing 3-benzoyl-1-(2-carbo-lower-alkoxyphenyl)oxindole which comprises heating N-benzoyl - 2 - carbo - lower - alkoxymethyl-2'-carbo-lower-alkoxydiphenylamine with an alkali metal lower-alkoxide at a temperature between 50° C. and 150° C. under anhydrous conditions.

4. The process for preparing 3-benzoyl-1-phenyloxindole which comprises heating N-benzoyl-2-carbo-lower-alkoxymethyldiphenylamine with an alkali metal lower-alkoxide at a temperature between 50° C. and 150° C. under anhydrous conditions.

5. A compound of the formula

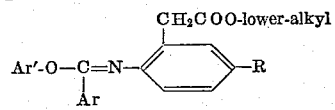

wherein Ar and Ar' each is a member of the group consisting of phenyl and phenyl substituted by from one to three substituents selected from the group consisting of lower-alkyl, lower-alkoxy, lower-alkylmercapto, halogen, carboxy, carbo-lower-alkoxy, nitro and trifluoromethyl, and R is a member of the group consisting of hydrogen and lower-alkoxy.

6. N-[2-(carbomethoxymethyl)phenyl]benzimino 2-carbomethoxyphenyl ether.

7. N-[2-(carbethoxymethyl)phenyl]benzimino 2 - carbomethoxyphenyl ether.

8. A compound of the formula

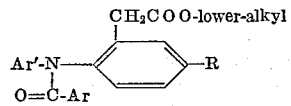

wherein Ar and Ar' each is a member of the group consisting of phenyl and phenyl substituted by from one to three substituents selected from the group consisting of lower-alkyl, lower-alkoxy, lower-alkylmercapto, halogen, carboxy, carbo-lower-alkoxy, nitro and trifluoromethyl, and R is a member of the group consisting of hydrogen and lower-alkoxy.

9. N-benzoyl - 2 - carbomethoxymethyl - 2' - carbomethoxydiphenylamine.

10. N - benzoyl - 2 - carbethoxymethyl - 2' - carbomethoxydiphenylamine.

11. N-benzoyl-2-carbomethoxymethyldiphenylamine.

12. 2-(2-carboxyanilino)phenylacetic acid.

13. A compound of the formula

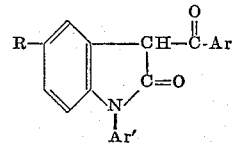

wherein Ar and Ar' each is a member of the group consisting of phenyl and phenyl substituted by from one to three substituents selected from the group consisting of lower-alkyl, lower-alkoxy, lower-alkylmercapto, halogen, carboxy, carbo-lower-alkoxy, nitro and trifluoromethyl, and R is a member of the group consisting of hydrogen and lower-alkoxy.

14. A compound of the formula

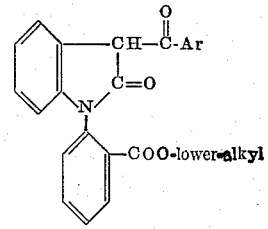

wherein Ar is phenyl.

15. 3-benzoyl-1-(2-carbomethoxyphenyl)oxindole.

16. 3-benzoyl-1-phenyloxindole.

17. 3-benzoyl-1-(2-carboxyphenyl)oxindole.

18. A compound of the formula

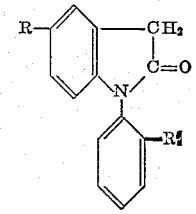

wherein R' is a member of the group consisting of carboxy and carbo-lower-alkoxy, and R is a member of the group consisting of hydrogen and lower-alkoxy.

19. 1-(2-carboxyphenyl)oxindole.
20. 1-(2-carbethoxyphenyl)oxindole.
21. A compound of the formula

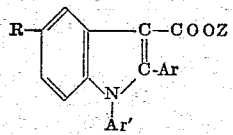

wherein R is selected from the group consisting of hydrogen and lower-alkoxy, Ar and Ar' each is a member of the group consisting of phenyl and phenyl substituted by from one to three substituents selected from the group consisting of lower-alkyl, lower-alkoxy, lower-alkylmercapto, halogen, carboxy, carbo-lower-alkoxy, nitro and trifluoromethyl, and Z is a member of the group consisting of hydrogen and carbo-lower-alkoxy.

22. 1-2-diphenylindole-3-carboxylic acid.
23. 1-(2-carbomethoxyphenyl)-2-phenylindole - 3 - carboxylic acid.
24. 1-(2-carbethoxyphenyl) - 2 - phenylindole - 3 - carboxylic acid.

25. A compound of the formula

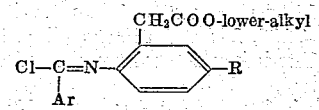

wherein Ar is a member of the group consisting of phenyl and phenyl substituted by from one to three substituents selected from the group consisting of lower-alkyl, lower-alkoxy, lower-alkylmercapto, halogen, carboxy, carbo-lower-alkoxy, nitro and trifluoromethyl and R is a member of the group consisting of hydrogen and lower-alkoxy.

References Cited by the Examiner

Bergmann, The Chemistry of Acetylene and Related Compounds, page 80, (1948).

Elderfield, Heterocyclic Compounds, vol 3, John Wiley and Sons, Inc., New York, 1952, page 146.

Muller, Methoden der Organischen Chemie, vol. XI/I, 4th Edition, pp. 910–913 (1957).

Wieberg et al., J. Am. Chem. Soc., vol 77, pp. 2205–2208 (1955).

NICHOLAS S. RIZZO, *Primary Examiner.*
IRVING MARCUS, *Examiner.*

UNITED STATES PATENT OFFICE
CERTIFICATE OF CORRECTION

Patent No. 3,189,617

June 15, 1965

Sydney Archer et al.

It is hereby certified that error appears in the above numbered patent requiring correction and that the said Letters Patent should read as corrected below.

Column 4, line 33, for "4-$Cl_6H_4$" read -- 4-$ClC_6H_4$ --; column 6, line 9, for "2-$(CH_3OOC)B_6H_4$" read -- 2-$(CH_3OOC)C_6H_4$ --; column 8, lines 48 and 49, for "N-[2-(carbomethoxymethyl)phenyl] benzimino phenyl ether" read -- N-[2-(carbomethoxymethyl)-4-methoxyphenyl]benzimino 2-carbomethoxyphenyl ether --; column 11, lines 54 and 55, for "1-(2-carmethoxyphenyl)-", in italics, read -- 1-(2-carbethoxyphenyl)- --, in italics; column 13, line 48, for "H, 21" read -- H, 4.21 --; column 14, line 7, for "R is $CH_3$" read -- R is $CH_3O$ --; line 26, for "2-Br-3,5-$Cl_2H_6H_2$" read -- 2-Br-3,5-$Cl_2C_6H_2$ --; column 15, line 58, for "2-$(CH_3OC)C_6H_4$" read -- 2-$(CH_3OOC)C_6H_4$ --.

Signed and sealed this 5th day of April 1966.

(SEAL)
Attest:

ERNEST W. SWIDER
Attesting Officer

EDWARD J. BRENNER
Commissioner of Patents